US010556210B2

(12) United States Patent
Nordsveen et al.

(10) Patent No.: US 10,556,210 B2
(45) Date of Patent: Feb. 11, 2020

(54) PREVENTION OF SURGE WAVE INSTABILITIES IN THREE PHASE GAS CONDENSATE FLOWLINES

(71) Applicant: STATOIL PETROLEUM AS, Stavanger (NO)

(72) Inventors: Magnus Nordsveen, Fjærdingby (NO); Robert Orr, Porsgrunn (NO); Bjørn Meland, Trondheim (NO); Terje Sira, Skedsmokorset (NO)

(73) Assignee: STATOIL PETROLEUM AS, Stavanger (NO)

( * ) Notice: Subject to any disclaimer, the term of this patent is extended or adjusted under 35 U.S.C. 154(b) by 36 days.

(21) Appl. No.: 15/120,909

(22) PCT Filed: Feb. 24, 2014

(86) PCT No.: PCT/EP2014/053531
§ 371 (c)(1),
(2) Date: Aug. 23, 2016

(87) PCT Pub. No.: WO2015/124214
PCT Pub. Date: Aug. 27, 2015

(65) Prior Publication Data
US 2016/0367957 A1 Dec. 22, 2016

(51) Int. Cl.
*B01D 47/00* (2006.01)
*B01D 53/14* (2006.01)
*B01F 17/00* (2006.01)

(52) U.S. Cl.
CPC .............................. *B01F 17/0021* (2013.01)

(58) Field of Classification Search
None
See application file for complete search history.

(56) References Cited

U.S. PATENT DOCUMENTS 3,773,110 A * 11/1973 Groves, Jr. ............... C09K 8/52
166/309
4,209,422 A * 6/1980 Zimmerman ........ B01D 17/047
44/433

(Continued)

FOREIGN PATENT DOCUMENTS

WO    WO 2008/140319 A1    11/2008

OTHER PUBLICATIONS

Hagesaether et al., "Flow-Assurance modeling: Reality checkand aspects of transient operations of gas/condensate Pipelines", XP002726231, Mar. 2007, vol. 2, No. 1.

(Continued)

*Primary Examiner* — Amber R Orlando
*Assistant Examiner* — Phillip Y Shao
(74) *Attorney, Agent, or Firm* — Birch, Stewart, Kolasch & Birch, LLP

(57) ABSTRACT

There is provided a process for the prevention or reduction of surge wave instabilities during the transport in a flowline of a three phase gas condensate comprising a gas phase, an aqueous phase and a condensate phase, characterized in that a dispersing agent is added to the three phase gas condensate which is able to disperse the aqueous phase in the condensate phase or the condensate phase in the aqueous phase, and a means for the prevention or reduction of surge wave instabilities during the transportation of a three phase gas condensate.

12 Claims, 4 Drawing Sheets

(56) References Cited

U.S. PATENT DOCUMENTS

| | | | |
|---|---|---|---|
| 2003/0166472 A1* | 9/2003 | Pursley | C09K 8/035 |
| | | | 507/200 |
| 2004/0211316 A1 | 10/2004 | Collins | |
| 2005/0115710 A1* | 6/2005 | Kotlar | C09K 8/502 |
| | | | 166/295 |
| 2007/0181307 A1 | 8/2007 | Yang | |
| 2009/0118380 A1* | 5/2009 | Del Gaudio | A61K 9/1075 |
| | | | 514/772 |
| 2009/0298723 A1* | 12/2009 | Leal Calderon | C09K 8/52 |
| | | | 507/260 |

OTHER PUBLICATIONS

International Search Report, issued in PCT/EP2014/053531 (PCT/ISA/210), dated Jul. 8, 2014.
Landsverk et al., "Multiphase flow behaviour at Snohvit", XP002726233, 2009, pp. 393-404.
Torpe et al., "Liquid surge handling at Asgard by model predictive control", XP002726232, 2009, pp. 7-16.
Written Opinion of the International Searching Authority, issued in PCT/EP2014/053531 (PCT/ISA/237), dated Jul. 8, 2014.

* cited by examiner

PREVENTION OF SURGE WAVE INSTABILITIES IN THREE PHASE GAS CONDENSATE FLOWLINES

FIELD OF THE INVENTION

The present invention is directed to a process for preventing surge instabilities in three phase gas condensate flowlines by making a dispersion of the aqueous and condensate phases such that the liquid phases behaves as a single phase and the three phase gas condensate flow thus behaves like a two-phase gas-liquid system. This is the concept behind the invention, as there is strong evidence that surge wave instabilities do not occur in two phase flows.

BACKGROUND TO THE INVENTION

Three phase surge wave instabilities have been observed occurring spontaneously in flowlines at otherwise stable conditions (e.g. no changes in flowrate, pressure, composition or temperature) in a number of gas condensate aqueous three phase flowlines (examples are the Huldra-Heimdal, Snøhvit and Mikkel-Midgard fields on the Norwegian Continental shelf).

Field data of three phase surge wave instabilities in a gas condensate flowline have been presented at the Multiphase Production Technology Conference, 12-14 Jun. 2013, Cannes, France by Pettersen et al in the paper: Liquid Inventory and Three Phase Surge Wave Data from the Midgard Gas Condensate Fields in the North Sea. The liquid surges are observed topside at the Åsgard B floater where they arrive with variation in surge volumes and frequency (see FIG. 1). The analysis shows that the onset of these surge waves occurs well into the friction dominated flow regime (see FIG. 2). The start of accumulation of water coincides with the first occurrence of surge flow (see FIG. 3). In predictions it is seen that this corresponds to liquid accumulation in the highest pipe inclinations.

The most important effect of the surge instabilities at Åsgard B is the problems with the liquid handling due to the large amount of liquid arriving at the receiving facility during the surging. The hydrate inhibitor surge drum runs full (surge capacity ~55 m$^3$) for low rates. The surge volumes increase when reducing the production rate and a minimum flow rate for the flowline is determined by the liquid handling capacity. It is not possible to produce through the flowlines at lower rates than the minimum flow rate. When the pressure in the reservoir is depleted the flow rates in the lines are reduced. When the rate reaches the minimum flow rate the production has to be stopped. By reducing the minimum flow rate it is possible to produce more from the field. The minimum flow rate is experienced at relatively high production rate for the Midgard field. Without any counter actions a considerable amount of gas will be left in the reservoir.

One effective measure to prolong the production is to reduce the pressure in the flowline. With reduced pressure the gas expands and drags along the liquid and effectively reduces the start of liquid accumulation and the minimum flow rate. However, reduction of the receiving pressure at Åsgard B comes with a cost and there is a limit to how much one can reduce the topside pressure. For the Mikkel-Midgard fields it has been decided to install a subsea compression station to boost and prolong the production for many years by reducing the well head pressures. Still the pressure between the compression station and Åsgard B will be relatively high. It is expected that the total production will still be limited by the surge wave instabilities.

Removing the instabilities will also make it easier to operate the production both at Åsgard B and at the subsea compression station. For instance at Åsgard B, hydrate formation has been experienced during unstable surge wave flow. This is believed to be caused by the irregular arrival of hydrate inhibitor/water at Åsgard B. This is currently remedied at Åsgard B by the additional injection of hydrate inhibitor topside when surge instabilities are expected.

Three phase surge wave instabilities are also seen at the Huldra-Heimdal field, where they have caused liquid handling problems. They are also experienced at the Snøhvit field. But at Snøhvit the production is tied back into a large slug catcher onshore and presently problems are not experienced there. However, if in the future there is a need to install a subsea compression station at Snøhvit there will potentially be a need to handle these surges.

Other publications that discuss three phase surge waves in multiphase systems include: Hagesæther, L. et al., Flow-Assurance Modeling: Reality Check and Aspects of Transient Operations of Gas/Condensate Pipelines, SPE Projects, Facilities & Construction, Volume 2, Number 1, March 2007, pp. 1-17; Torpe, H. et al., Liquid Surge Handling at Åsgard by Model Predictive Control, 14th International Conference on Multiphase Production Technology, Cannes, 17-19 Jun. 2009; and Landsverk, G. S. et al., Multiphase Flow Behaviour at Snøhvit, 14th International Conference on Multiphase Production Technology, Cannes, 17-19 Jun. 2009

It is the aim of the present invention to address the problems of reduced gas production caused by surge wave instabilities in three phase gas condensate flowlines.

SUMMARY OF THE INVENTION

Extensive investigations have been conducted into three phase surge flow instabilities. These studies indicate that the instabilities are a three phase phenomenon related to slip between the aqueous and the condensate phases in gas condensate flowlines. This type of instability has not been observed in two-phase flowlines. Also laboratory studies in a pipe have demonstrated instabilities in three phase flow but not in two phase flow. Finally, theoretical analysis support that this type of instability only can occur in three phase flow and not in two-phase flow.

Based on these observations, we arrived at the concept behind the present invention that the dispersion of the condensate and aqueous phases in a three phase system would result in the liquids behaving like one phase with mixture fluid properties. As we have demonstrated that two phase systems do not demonstrate surge wave instabilities, this conversion of a three phase system to a two phase system by dispersion of the condensate and aqueous phases achieves the desired effect of preventing surge wave instabilities and thus addressing all of the problems discussed above such as increasing the total production rate and reducing the minimum flow rate.

To obtain a dispersion, a suitable dispersing agent should be added to either or both of the liquid phases. The effect of the dispersing agent is to disperse the aqueous phase in the condensate phase or to disperse the condensate phase in the aqueous phase. As a consequence, the slip between the two liquid phases—the aqueous and condensate phases—is no longer possible and hence the cause of the three phase surge flow instabilities is removed. Hence, the aim of the present invention is achieved.

Thus, in a first aspect of the present invention there is provided a process for the prevention or reduction of surge wave instabilities during the transport in a flowline of a three phase gas condensate comprising a gas phase, an aqueous phase and a condensate phase, characterized in that a dispersing agent is added to the three phase gas condensate which is able to disperse the aqueous phase in the condensate phase or the condensate phase in the aqueous phase.

Adding a dispersing agent to the liquid phase(s) to form a liquid dispersion removes the surge wave instabilities and increases the total production from the field because as a result it is possible to operate the flowlines at a lower flow rate. It is also possible to obtain improved regularity with stable flow. Furthermore, hydrate problems previously experienced are reduced. Finally, restrictions in operating the flowlines are reduced or eliminated.

In a second embodiment of the invention, there is provided a means for the prevention or reduction of surge wave instabilities during the transportation of a three phase gas condensate comprising a gas phase, an aqueous phase and a condensate phase, said means comprising a flowline for the transportation of said three phase gas condensate, said means being characterized in that there is further provided an injection means which is in fluid communication with said flowline, said injection means being suitable to inject a dispersing agent into the three phase gas condensate which is able to disperse the aqueous phase in the condensate phase or the condensate phase in the aqueous phase.

DETAILED DESCRIPTION OF THE INVENTION

The present invention will be described in the following in further detail with reference to the appended drawings, none of which should be construed as limiting the scope of the invention.

Figure 1:
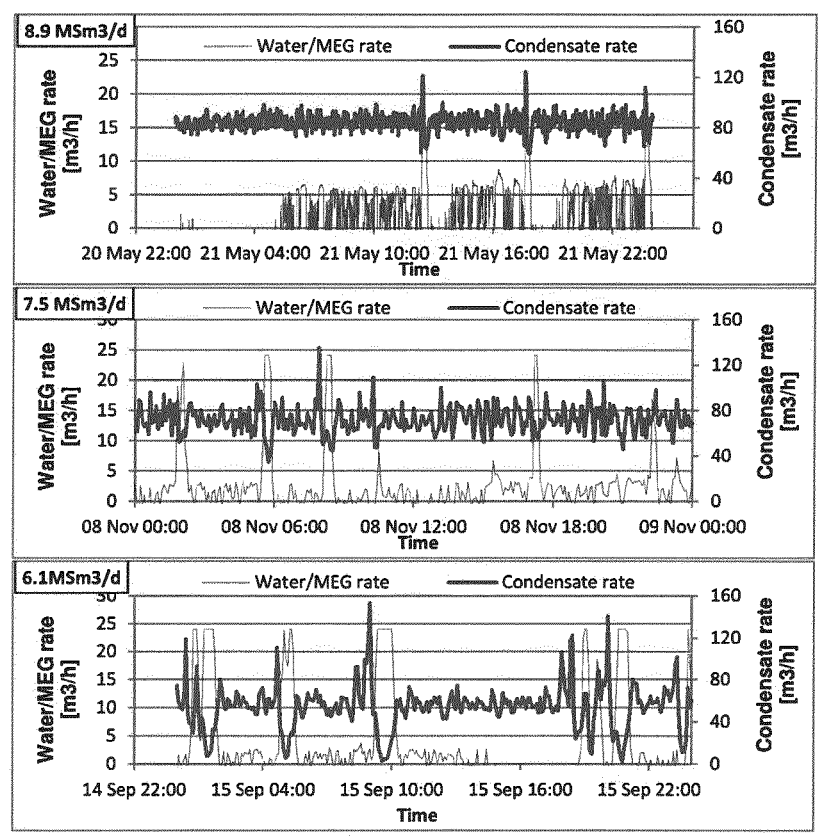
FIG. 1 is a plot of surge volumes against frequency for a three phase condensate.
Figure 2:
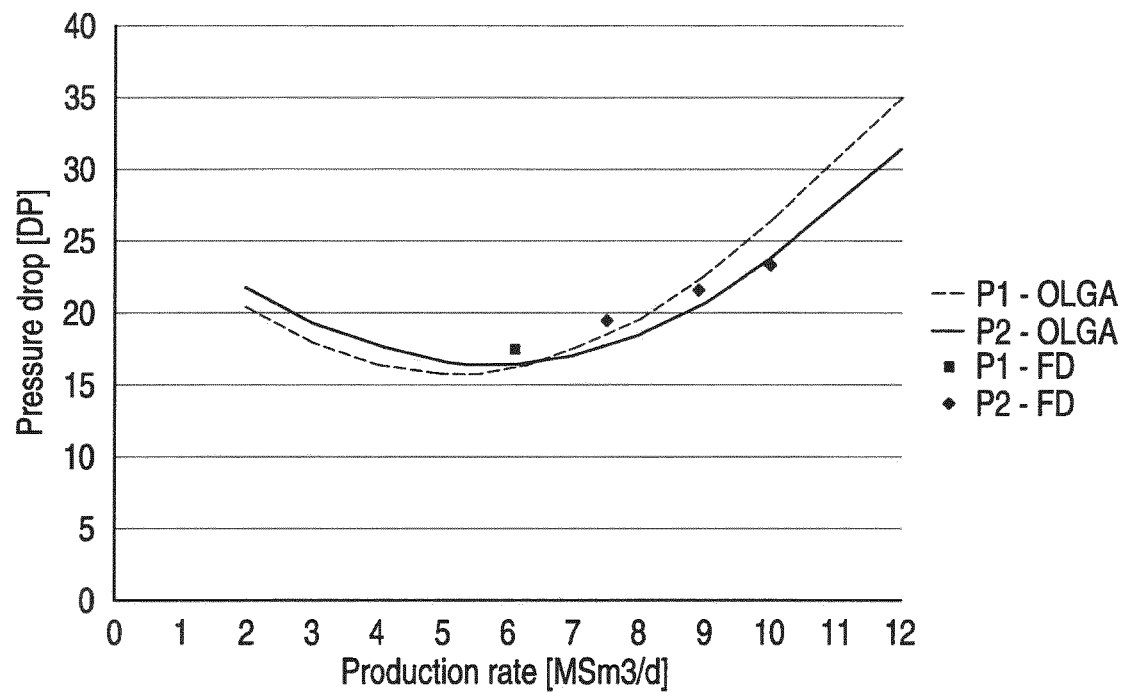
FIG. 2 is a plot of pressure drop in a flowline as a function of production rate.
Figure 3:
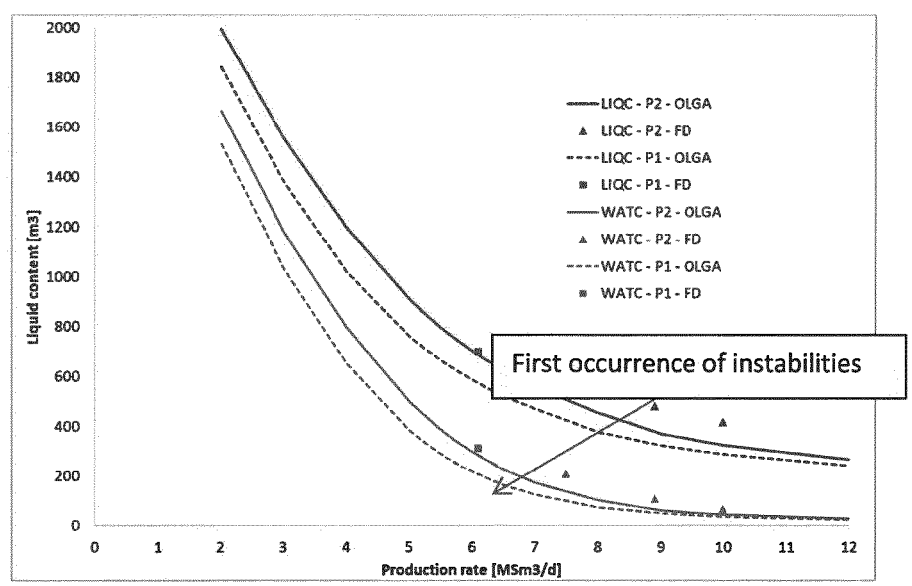
FIG. 3 is a plot of liquid content in a flowline against production rate.

As noted earlier, three phase surge wave instabilities are known to occur spontaneously in flowlines at otherwise stable conditions (particularly no changes in flowrate, pressure, composition or temperature) in a number of three phase flowlines, particularly gas condensate aqueous flowlines. This leads to a number of problems. First, these surge wave instabilities in three phase systems can cause liquid handling problems. Second, this entails a minimum flow rate for the flowline, leading to reduced total production. Third, the likelihood of hydrate formation is increased due to loss of hydrate inhibitor/water at the end of the flowline during surging. Finally, they result in restrictions in operating the flowlines.

Based on our studies, experimental work and theoretical analysis, we expect that the addition of a dispersing agent to the liquid phase(s) to form a liquid dispersion removes the surge wave instabilities and increases the total production from the field because as a result it is possible to operate the flowlines at a lower flow rate. It is also possible to obtain improved regularity with stable flow. Furthermore, hydrate problems previously experienced are reduced. Finally, restrictions in operating the flowlines are reduced/eliminated.

In a preferred aspect of the first embodiment of the invention, the dispersing agent which is added to the three phase gas condensate which is able to disperse the aqueous phase in the condensate phase or the condensate phase in the aqueous phase is any dispersing agent which is able to prevent slip between the aqueous phase and the condensate phase, i.e. one which forms an emulsion. Preferably, it is one or more dispersing agents selected from oil soluble surfactants for oil continuous flow and water soluble surfactants for oil continuous flow, preferably oil soluble surfactants. Further suitable dispersing agents will be immediately apparent to the person of ordinary skill in this field and these also fall within the scope of the dispersing agents suitable for use in the present invention.

Suitable non-ionic oil soluble surfactants are those having a low HLB (hydrophilic-lipophilic balance), typically but not exclusively those having an HLB of 10 or lower. These promote the formation of water in oil emulsions. These include non-ionic oil soluble fatty acid monoesters of sorbitan (Span® surfactants) such as Span® 60, Span® 65, Span® 80 and Span® 83. Span® 80, for example, is sorbitan monooleate and has the following formula:

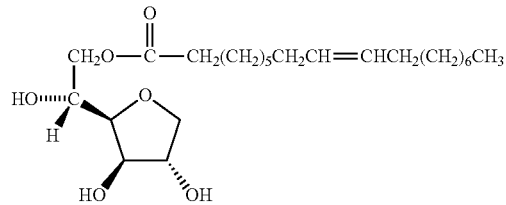

Other suitable oil soluble surfactants include polyoxyethylene alkylphenylethers, branched, such as polyoxyethylene (5) nonylphenylether, branched. Further non-ionic oil soluble surfactants will be readily apparent to the person of ordinary skill in this field and also fall within the scope of the non-ionic oil soluble surfactants suitable for use in the present invention.

Suitable water soluble surfactants are those having a high HLB (i.e. typically but not exclusively those having an HLB of greater than 10). These promote the formation of oil in water emulsions. Suitable water soluble surfactants include water soluble ethoxylated fatty acid monoesters of sorbitan (Tween® surfactants) such as Tween® 20. Other suitable water soluble surfactants include poly(propylene glycol)-block-poly(ethylene glycol)-block-poly(propylene glycol) average $M_n$=2,000 (PPG-PEG-PPG Pluronic® 10R5). Further suitable water soluble surfactants will be readily apparent to the person of ordinary skill in this field and also fall within the scope of the water soluble surfactants suitable for use in the present invention.

The amount of dispersing agent that needs to be added will vary depending upon the identity of the dispersing agent, the nature of the three phase gas condensate system, temperature, pressure and the like. Typically, the dispersing agent which is added to the three phase gas condensate is added at a dosing level of from 5 to 10,000 ppm (i.e. parts dispersing agent per million parts gas condensate), more preferably from 10 to 1,000 ppm, e.g. 10 ppm, 100 ppm, 500 ppm, 750 ppm and 1000 ppm.

Further chemicals may be added to the mixture generated after addition of the dispersing agent to allow better processing. These include demulsifiers. Demulsifiers are added to separate the emulsion formed by the addition of a surfactant. This allows easier separation of the condensate and aqueous phases. Suitable demulsifiers include acid or base catalyzed phenol-formaldehyde resin demulsifiers and epoxy resin demulsifiers.

The dispersing agent which is added to the three phase gas condensate is able to disperse the aqueous phase in the condensate phase, or it is able to disperse the condensate phase in the aqueous phase.

In a further preferred aspect of the means according to the present invention for the prevention or reduction of surge wave instabilities during the transportation of a three phase gas condensate, a further injection means is provided which is in fluid communication with the flowline at a point downstream from the point of injection of the dispersing agent, the further injection means being suitable for the injection of a processing chemical into the mixture obtained after dispersion of the three phase gas condensate, e.g. a demulsifier.

Although not wishing to be bound by theory, we believe that the following provides an explanation why surge waves are able to form in the three phase gas condensate flowlines but not in the two phase flowlines. An analysis of the governing equations for these types of surge flow has been done. The surges are long wave length mass waves. In order to simplify the equations the fast dynamics associated with the pressure waves compared to the dynamics of the mass waves were ignored. By assuming constant phase densities, the pressure wave velocity essentially goes to infinity, and the pressure wave dynamics can be decoupled from the mass wave dynamics. Furthermore, short wavelength gravity waves can be ignored and the equations simplified by invoking the long wavelength approximation. The mass equation for a two phase gas-liquid system can then be written:

$$\frac{\partial h}{\partial t} + \frac{\partial}{\partial x}(U_{SL}(h)) = \frac{\partial h}{\partial t} + \frac{dU_{SL}}{dh}\frac{\partial h}{\partial x} \equiv \frac{\partial h}{\partial t} + c_s(h) \cdot \frac{\partial h}{\partial x} = 0$$

This is a first order wave equation, describing the advection (transport) of holdup (h) with an amplitude dependent velocity ($c_s(h)$). $U_{SL}$ is the superficial liquid velocity. By invoking a Neumann stability analysis of this equation it is readily seen that this equation is always stable. This indicates that it is not possible to have long surge wave instabilities (as seen in the Midgard field) in a two-phase system.

Applying the same analysis to a three phase system (condensate, water and gas) we get the following mass equations for the liquids ($h_o$ is oil holdup, $h_w$ is water holdup):

$$\frac{\partial}{\partial t}\begin{pmatrix} h_o \\ h_w \end{pmatrix} + \frac{\partial}{\partial x}\begin{pmatrix} U_{SO} \\ U_{SW} \end{pmatrix} = \frac{\partial}{\partial t}\begin{pmatrix} h_o \\ h_w \end{pmatrix} + \begin{pmatrix} \frac{\partial U_{SO}}{\partial h_o} & \frac{\partial U_{SW}}{\partial h_w} \\ \frac{\partial U_{SO}}{\partial h_o} & \frac{\partial U_{SW}}{\partial h_w} \end{pmatrix} \frac{\partial}{\partial x}\begin{pmatrix} h_o \\ h_w \end{pmatrix} = 0$$

For this equation system we have a 2×2 wave velocity matrix and a stability analysis readily shows that this system can have an unstable mode. This indicates that in a three phase system surge wave instabilities can develop.

As demonstrated, the pure two phase surge waves are inherently stable, while in the three phase case it is possible for unstable waves to develop. We believe that this instability is the reason behind the long wavelength oscillations that has been observed on Åsgard B and similar gas condensate fields.

Through the development of the present invention, we believe that by adding a dispersing agent to the liquid phase(s) to form a liquid dispersion it is possible to remove the surge wave instabilities and increase the total production from the field. As a consequence, it is possible to operate flowlines at lower flow rates, enabling increased production. For instance for the Mikkel-Midgard fields it is estimated that the total gas production will be increased by 2 GSm$^3$ if the minimum flow rate of the flowlines can be reduced by 20%.

Furthermore, it gives improved regularity with stable flow. Hydrate problems previously experienced are reduced. Furthermore, restrictions in operating the flowlines are reduced or eliminated.

The present invention may be further understood by consideration of the following non-limiting examples.

EXAMPLES

Example 1

In two and three phase experiments at Institute for Energy Technology (IFE), it has been demonstrated that surge wave instabilities occur in three phase flows but not in two phase flows, as predicted in our analysis of the governing equations above.

Figure 4:
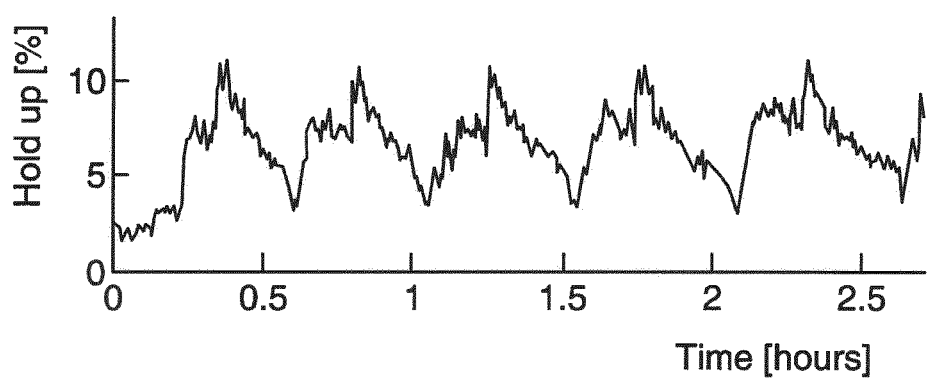
FIG. 4 is a plot of hold up oscillation (%) against time due to three phase surge waves.

In this example, the flow for a two phase mixture comprising an oil phase and a gas phase was measured. No instabilities were found to occur for this two phase flow. However, when water was added to the mixture to give a three phase mixture surge wave instabilities were found to occur (see FIG. 4). The instabilities occurred in the transition from low to high holdup at Usg=2.5 m/s for Usl=6 mm/s and a pipe inclination of 3°.

Example 2

Figure 5:
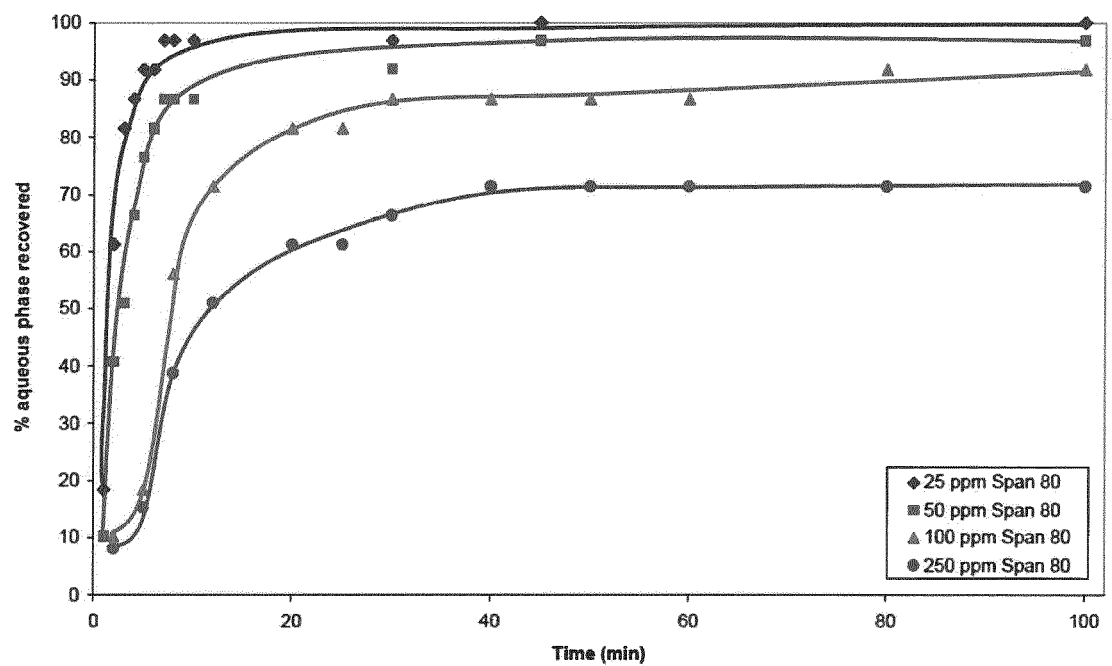
FIG. 5 is a plot of % aqueous phase recovered against time for a 35% emulsion shaken at 330 rpm for 15 hours, sowing the effect of varying the concentration of Span 80®.

Condensate from the Troll field and aqueous phase (60 wt % MEG in pure water) was transferred to a container. The mix had a 35% water-cut. Span 80® was added as an emulsifier in different concentrations. Concentration of emulsifier is given as ppm of the total amount of oil in the emulsion. The emulsification was carried out by shaking using an reciprocating shaker (HS 501 digital, IKA Labortechnik). The condensate/water-blend was shaken at 330 rpm for 2 or 15 hours. Negligible differences in emulsion behavior were observed upon a change in shaking time from 2 to 15 hours.

mixing of the two phases was carried out by shaking as above. The stability towards gravity for emulsions (35% aqueous phase) shaken at 330 rpm for 15 hours is illustrated in FIG. 5. The Span-80® concentration was varied from 25 to 250 ppm. As soon as the agitation stopped, the destabilization process started. The kinetics of destabilization and the final level of resolved aqueous phase were determined by the Span-80 concentration. By tuning the concentration of added emulsifier, it was found that it was possible to produce a system which gives a stable w/o-emulsion during agitation, and a destabilization without agitation. These types of data have also been obtained for emulsions mixed by means of gentle manual shaking.

It has been demonstrated that a mixture of water and MEG can be emulsified into a condensate by using Span-80. The emulsification can be achieved independent of the magnitude of energy input through tuning of the Span-80 concentration.

It has been demonstrated that Span 80® is highly efficient in forming a dispersion of aqueous phase in Troll condensate. By using Span-80® as the emulsifier it is possible to produce an emulsion stable during agitation and unstable after agitation. This emulsification can be achieved independent of the magnitude of energy input through tuning of the Span-80® concentration. It has also been demonstrated that with increasing concentration of Span 80® the emulsion can be stable for a long time even at rest (for instance in a separator). This indicates that for this surfactant one may need a demulsifier to improve the separation.

Thus, it is possible to conclude that through the use of a suitable dispersing agent such as the w/o emulsifier Span-80® it is possible to transform a two-phase flow system to a stable single phase liquid flow. As it is demonstrated in Example 1 that surge wave instabilities occur in three-phase flows but not two phase flows, this transformation of the two liquid phases to a single stable phase will enable the removal of the surge wave instabilities and increase the total production from the field.

The invention claimed is:

1. A process for the prevention or reduction of surge wave instabilities during the transport in a flowline of a three phase gas condensate comprising a gas phase, an aqueous phase and a condensate phase, said method comprising:
adding a dispersing agent to the three phase gas condensate which is able to disperse the aqueous phase in the condensate phase or the condensate phase in the aqueous phase, wherein the addition of the dispersing agent prevents or reduces surge wave instabilities and enables the flowline to operate at a lower flow rate than when the same flowline is operated without addition of said dispersing agent;
wherein the dispersing agent which is added to the three phase gas condensate is added at a dosing level of from 10 to 1,000 ppm.

2. The process according to claim 1, wherein the dispersing agent which is added to the three phase gas condensate is one or more dispersing agent selected from the group consisting of oil soluble surfactants and water soluble surfactants.

3. The process according to claim 1, wherein the dispersing agent which is added to the three phase gas condensate is an oil soluble surfactant.

4. The process according to claim 1, wherein the dispersing agent which is added to the three phase gas condensate is one or more dispersing agent selected from the group consisting of non-ionic oil soluble fatty acid monoesters of sorbitan and water soluble ethoxylated fatty acid monoesters of sorbitan.

5. The process according to claim 1, wherein the dispersing agent which is added to the three phase gas condensate is at least one Span® surfactant selected from the group consisting of sorbitan stearate (Span® 60), sorbitan tristearate (Span® 65), sorbitan monooleate (Span® 80) and sorbitan sesquioleate (Span® 83).

6. The process according to claim 1, wherein the dispersing agent which is added to the three phase gas condensate is able to disperse the condensate phase in the aqueous phase.

7. The process according to claim 1, wherein the dispersing agent which is added to the three phase gas condensate is able to disperse the aqueous phase in the condensate phase.

8. The process according to claim 1, further comprising adding a processing chemical to a mixture produced after addition of the dispersing agent.

9. The process according to claim 1, further comprising adding a processing chemical to a mixture produced after addition of the dispersing agent, wherein said processing chemical is a demulsifying agent.

10. The process according to claim 1, further comprising adding a processing chemical to a mixture produced after addition of the dispersing agent, wherein said processing chemical is selected from the group consisting of acid catalyzed phenol-formaldehyde resin demulsifiers, base catalyzed phenol-formaldehyde resin demulsifiers, and epoxy resin demulsifiers.

11. The process according to claim 4, wherein the dispersing agent which is added to the three phase gas condensate is one or more dispersing agent selected from the group consisting of non-ionic oil soluble fatty acid monoesters of sorbitan (Span® surfactants) and water soluble ethoxylated fatty acid monoesters of sorbitan (Tween® surfactants).

12. The process according to claim 5, wherein the dispersing agent which is added to the three phase gas condensate is sorbitan monooleate (Span® 80).

* * * * *